United States Patent
Girolamo

(10) Patent No.: US 11,181,095 B2
(45) Date of Patent: Nov. 23, 2021

(54) SPAR CAP, WIND TURBINE BLADE, WIND TURBINE AND METHOD FOR MANUFACTURING A SPAR CAP

(71) Applicant: Siemens Gamesa Renewable Energy A/S, Brande (DK)

(72) Inventor: Donato Girolamo, Voorhout (NL)

(73) Assignee: SIEMENS GAMESA RENEWABLE ENERGY A/S

(*) Notice: Subject to any disclaimer, the term of this patent is extended or adjusted under 35 U.S.C. 154(b) by 32 days.

(21) Appl. No.: 16/852,625

(22) Filed: Apr. 20, 2020

(65) Prior Publication Data
US 2020/0340446 A1 Oct. 29, 2020

(30) Foreign Application Priority Data
Apr. 25, 2019 (EP) .................................... 19171004

(51) Int. Cl.
*F03D 1/06* (2006.01)
*F03D 80/30* (2016.01)
(Continued)

(52) U.S. Cl.
CPC ........... *F03D 1/0675* (2013.01); *F03D 80/30* (2016.05); *B29D 99/0028* (2013.01);
(Continued)

(58) Field of Classification Search
CPC ...... F03D 1/0633; F03D 1/0641; F03D 1/065; F03D 1/0675; F03D 1/0683; F03D 80/30;
(Continued)

(56) References Cited

U.S. PATENT DOCUMENTS 7,494,324 B2 * 2/2009 Hibbard ................. H02G 13/00
416/230
9,816,482 B2 * 11/2017 Caruso .................. F03D 1/0633
(Continued)

FOREIGN PATENT DOCUMENTS

EP 1692752 A1 8/2006
EP 2889477 A1 7/2015
(Continued)

OTHER PUBLICATIONS

European Search Report and Written Opinion of the European Searching Authority dated Nov. 19, 2019 for Application No. 19171004.5.

*Primary Examiner* — J. Todd Newton, Esq.
*Assistant Examiner* — Sang K Kim
(74) *Attorney, Agent, or Firm* — Schmeiser, Olsen & Watts LLP

(57) ABSTRACT

A spar cap for a wind turbine blade of a wind turbine, the spar cap including at least one elongated beam is provided. The spar cap includes at least one electrically isolating material cover and at least one electrically conductive material cover, wherein an entire circumference of the beam is enclosed by at least one electrically isolating material cover and the entire circumference of the at least one electrically isolating material cover is enclosed by at least one electrically conductive material cover, whereby the electrically conductive material cover has at least one electrical interface for electrically connecting it to a down conductor of the wind turbine blade.

13 Claims, 3 Drawing Sheets

Figure 1:
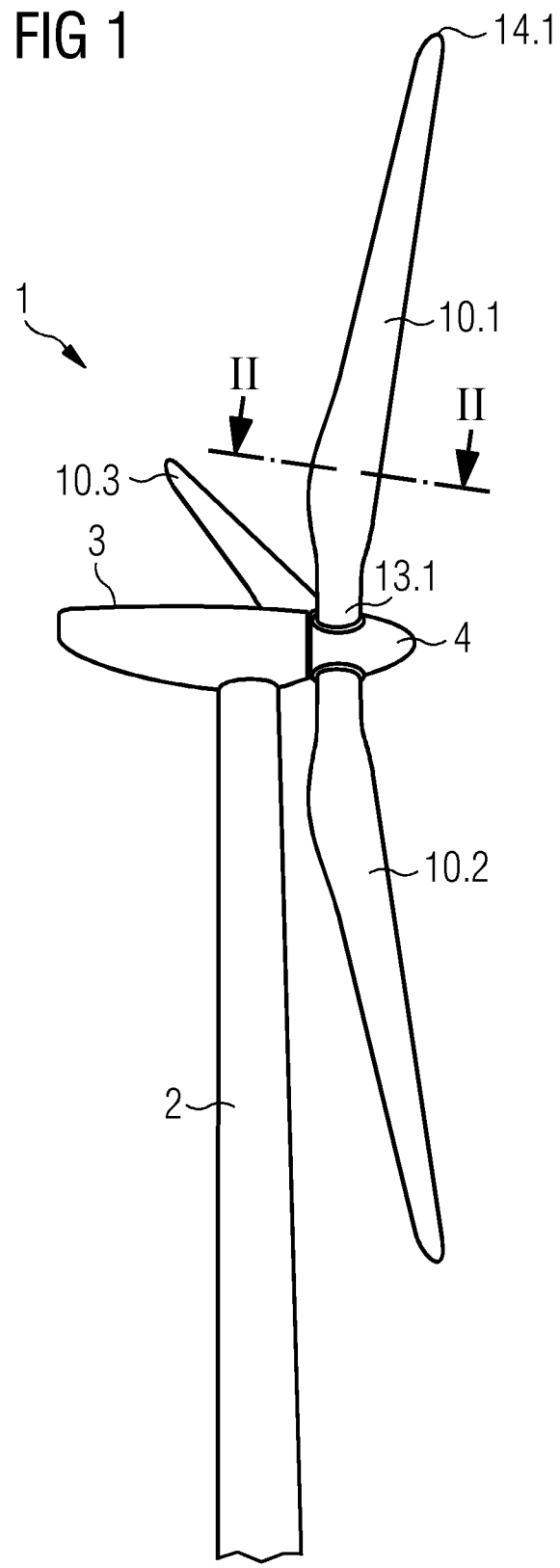

(51) Int. Cl.
*B29D 99/00* (2010.01)
*B29L 31/08* (2006.01)

(52) U.S. Cl.
CPC . *B29L 2031/085* (2013.01); *F05B 2280/2006* (2013.01); *F05B 2280/6003* (2013.01)

(58) Field of Classification Search
CPC ........... B29D 99/0028; B29L 2031/085; F05B 2280/2006; F05B 2280/6003
See application file for complete search history.

(56) References Cited

U.S. PATENT DOCUMENTS

| | | |
|---|---|---|
| 10,648,456 B2 * | 5/2020 | Shain ................... F03D 80/40 |
| 2007/0074892 A1 | 4/2007 | Hibbard |
| 2008/0073098 A1 | 3/2008 | Llorente Gonzalez et al. |
| 2012/0134826 A1 | 5/2012 | Rua et al. |
| 2014/0348654 A1 * | 11/2014 | Klein ................... F03D 80/40 |
| | | 416/95 |
| 2015/0292479 A1 | 10/2015 | Ohlerich et al. |
| 2016/0327028 A1 | 11/2016 | March Nomen et al. |
| 2018/0258916 A1 * | 9/2018 | Sawada ................ F03D 17/00 |

FOREIGN PATENT DOCUMENTS

| | | | |
|---|---|---|---|
| EP | 2930355 A1 | 10/2015 | |
| EP | 3483424 A1 | 5/2019 | |
| EP | 3511560 A1 | 7/2019 | |
| EP | 3594494 A1 | 1/2020 | |
| WO | WO2005050808 | 6/2005 | |
| WO | WO-2020084053 A1 * | 4/2020 | ........... F03D 1/0633 |

\* cited by examiner

SPAR CAP, WIND TURBINE BLADE, WIND TURBINE AND METHOD FOR MANUFACTURING A SPAR CAP

CROSS-REFERENCE TO RELATED APPLICATIONS

This application claims priority to European Application No. 19171004.5, having a filing date of Apr. 25, 2019, the entire contents of which are hereby incorporated by reference.

FIELD OF TECHNOLOGY

The following is directed to a spar cap for a wind turbine blade of a wind turbine blade, a wind turbine blade for a wind turbine, a wind turbine and a method for manufacturing a spar cap.

BACKGROUND

Wind turbine blades must be able to efficiently convert wind into spinning movement of the wind turbine blades, so that energy of the wind can be converted into rotary mechanical movement of a rotor to which the wind turbine blades are attached. It is preferable, to use materials having a high specific modulus (elastic modulus per mass density of a material), also known as stiffness to weight ratio, in wind turbine blades to deal with the square-cube law governing the scaling of wind turbine blades. Therefore, composite materials such as carbon fiber-reinforced plastic having a high specific modulus can be used in wind turbine blades, in particular in spar caps of the wind turbine blades. However, carbon fiber-reinforced plastic, for example, is electrically conductive and can interact with a lightening protection system of the wind turbine blade, when the spar cap of the wind turbine blade intercepts a lightning strike. Currently, to mitigate a risk of failure due to lightning strike, a potential equalization between the down-conductor of the lightning protection system and the conductive composite material is provided. In practice, this requires that a sufficient number of discrete connection points between the down conductor and the conductive composite material are provided along the length of the spar cap the wind turbine blade. It is challenging to design and realize reliable electrical connections between the carbon fiber reinforced plastic and the down-conductor due to the very different nature of the two materials. Moreover, this technique is vulnerable to malfunctioning connections, since the number of connections is usually kept at a minimum to facilitate manufacturability. Thus, a single malfunctioning connection may result in inadequate potential equalization and consequent flashovers and possible failure of the wind turbine blade. Additionally, these electrical connections are implemented during the manufacturing of the entire wind turbine blade. In particular, the electrical connections are implemented in a mold of the wind turbine blade with tight tolerances that become difficult to achieve for large structures and, if faulty, are very difficult to detect and expensive to repair.

SUMMARY

An aspect relates to a spar cap, in which the previously described disadvantages are eliminated or at least partially reduced. In particular, it is an aspect to provide a spar cap for a wind turbine blade of a wind turbine, a wind turbine blade of a wind turbine and a method of manufacturing a spar cap for a wind turbine blade of a wind turbine, by which provide an easy, inexpensive and good protection against damage that might be caused by a lightning strike intercepted.

Thereby, the features and details described in connection with the spar cap of embodiments of the invention apply in connection with the wind turbine blade of embodiments of the invention, the wind turbine of embodiments of the invention and the method of embodiments of the invention, so that regarding the disclosure of the individual aspects of embodiments of the invention it is or can be referred to one another.

According to a first aspect of embodiments of the invention, a spar cap for a wind turbine blade of a wind turbine, the spar cap comprising at least one elongated beam, whereby the spar cap comprises at least one electrically isolating material cover and at least one electrically conductive material cover, wherein an entire circumference of the beam is enclosed by at least one electrically isolating material cover and the entire circumference of the at least one electrically isolating material cover is enclosed by at least one electrically conductive material cover, whereby the electrically conductive material cover has at least one electrical interface for electrically connecting it to a down conductor of the wind turbine blade.

The proposed arrangement with the electrically conductive material cover functions as a faraday cage blocking electromagnetic fields and thereby protecting the beam, which in particular comprises or is made from a conductive material, from any damage that might be caused by a lightning strike intercepted by the spar cap. The proposed simple solution can be easily and at a low cost integrated in a lightning protection system comprising the down conductor of the wind turbine blade. A risk of providing malfunctioning electrical connections is eliminated because there is no need to connect the carbon fiber reinforced plastic of the spar cap via electrical connections to the down conductor anymore.

The electrically isolating material cover may comprise multiple material layers. In particular, the electrically isolating material cover may be wrapped around the beam. The electrically isolating material cover may have an overlapping section. In the overlapping section of the electrically isolating material cover, ends of the electrically isolating material cover may be connected to one another, e.g. by means of an adhesive. The electrically isolating material cover may be made from a single part or multiple parts, which are connected to one another, e.g. by means of adhesion. Due to easier removal of one of multiple parts of the electrically isolating material cover, the beam is made more accessible for serviceability purposes.

The electrically conductive material cover may comprise multiple material layers. In particular, the electrically conductive material cover may be wrapped around the electrically isolating material cover. The electrically conductive material cover may have an overlapping section. In the overlapping section of the electrically conductive material cover, ends of the electrically conductive material cover may be connected to one another, e.g. by means of an adhesive or by means of welding. The electrically conductive material cover may be made from a single part or multiple parts, which are connected to one another, e.g. by means of adhesion or welding. Due to easier removal of one of multiple parts of the electrically conductive material cover, the beam is made more accessible for serviceability purposes.

In particular, the enclosed circumference of the beam and/or the enclosed circumference of the electrically isolating material cover runs transverse to a longitudinal direction of the at least one beam. In particular, the electrically isolating material cover is at no distance from the beam.

Moreover, in particular, the electrically conductive material cover is at no distance from the electrical isolating material cover.

The at least one electrical interface may be an electrically conductive surface of the electrically conductive material cover or an additional electrical conductor, for example.

The spar cap may have wedge elements arranged adjacent to the at least one beam. In particular, wedge elements may be arranged opposite to each other adjacent to the at least one beam.

However, it is not necessary to provide the electrically isolating material cover and/or the electrically conductive material cover around the entire circumference of the spar cap. Preferably, when there are wedge elements, which may be made from balsa, for example, arranged adjacent to the at least one beam, the electrically isolating material cover and/or the electrically conductive material cover is enclosing only the beam but not the wedge elements.

In a preferred embodiment of the invention, the electrically isolating material cover and/or the electrically conductive material cover are arranged along at least 80% of a length of the beam and preferably at least along the entire length of the beam and more preferably beyond the entire length of the beam, so that the electrically conductive material cover extends beyond at least one longitudinal end, preferably beyond both longitudinal ends, of the beam. Moreover, the electrically isolating material cover and/or the electrically conductive material cover may be entirely enclosing the beam. Thereby, the lightning protection capabilities are increased.

In a moreover preferred embodiment of the invention, the electrically isolating material cover comprises glass fibers. In particular, the electrically isolating material cover may be made from a glass fiber material. Thereby, the weight addition of the electrically isolation material to the spar cap is being kept at a minimum. Glass fibers also contribute to the overall stiffness and strength of the beam.

In yet another preferred embodiment of the invention, the electrically conductive material cover is a metal mesh. The electrically conductive material cover may comprise multiple metal meshes connected to one another. This is a particular lightweight and effective way of protecting the beam.

In a further embodiment of the invention, the at least one beam is precasted. Thereby, it is prevented that the beam must be casted together with the electrically isolating material cover and the electrically conductive material cover, whereby better size accuracy of the spar cap is achieved.

In a moreover preferred embodiment of the invention, the at least one elongate beam comprises carbon fiber-reinforced plastic. In particular, the at least one elongate beam may be made from carbon fiber-reinforced plastic and more particularly strips of the elongate beam may be made from carbon fiber-reinforced plastic. The at least one beam may be a pultruded element. The beam may comprise at least two stacks of multiple strips stacked on top of one another, wherein the at least two stacks are arranged adjacent to one another.

According to a second aspect of embodiments of the invention, a wind turbine blade for a wind turbine, the wind turbine blade having a shell, a down conductor and a spar attached to the shell, wherein the spar comprises two spar caps and a spar web connecting the two spar caps with one another, whereby at least one of the spar caps is according to embodiments of the invention.

In preferred embodiment of the invention, the at least one electrical interface of the electrically conductive material cover is connected to the down conductor by means of at least one metal conductor. The metal conductor may comprise or be made from copper, for example. The at least one metal conductor may be arranged in a direction transverse or substantially transverse to the longitudinal direction of the elongate beam.

A metal conductor may be arranged as an equipotential connection in a middle portion of the beam or spar cap. The equipotential connection can equipotentialize a voltage built up between the down conductor and the electrically conductive material along the length of the spar cap. The middle portion may in particular be a portion having a distance of at least 10 m, in particular 20 m from a tip and a root of the beam or spar cap. The amount of such equipotential connections may be a function of the length of the beam. For example, an equipotential connection may be provided every 10 to 50 m, in particular every 20 to 40 m of length of the wind turbine blade.

Preferably, at least one of the at least one metal conductor is a flexible metal cable. The flexible metal cable may be a braided cable, for example. Thereby, many design options for routing the metal conductor to the down conductor are provided and the length of the metal conductor can be kept at a minimum.

Moreover preferably, at least one of the at least one metal conductor is provided at or within a distance of 5% of the length of the beam from a root of the wind turbine blade and/or at least one of the at least one metal conductor is provided at or within a distance of 5% of the length of the beam from a tip of the wind turbine blade. Thereby, efficient current transfer from the electrically conductive material cover to the down conductor is provided. In particular, there is no need for further metal conductors in between these two. However, it is possible to provide more than two metal conductors.

In a preferred embodiment of the invention, the down conductor is attached to the spar web, preferably along at least 80% and moreover preferably along at least 90% of the length of the spar web. Thereby, a compact arrangement of the down conductor within the wind turbine blade can be achieved.

According to a third aspect of embodiments of the invention, a wind turbine comprising at least one wind turbine blade according to embodiments of the invention.

According to a fourth aspect of embodiments of the invention, a method of manufacturing a spar cap for a wind turbine blade of a wind turbine, the spar cap comprising at least one elongated beam, whereby the method comprises the steps of: (a) enclosing an entire circumference of the beam by at least one electrically isolating material cover, (b) enclosing an entire circumference of the at least one electrically isolating material cover by at least one electrically conductive material cover, and (c) providing the electrically conductive material cover with at least one electrical interface for electrically connecting it to a down conductor of the wind turbine blade.

In an embodiment of the invention, the at least one beam is casted prior to being enclosed by the electrically isolating material cover and the electrically conductive material cover.

In a preferred embodiment of the invention, the at least one beam is precasted together with the isolating material cover and/or the electrically conductive material. Further, the at least one beam may be precasted together with the metal conductors. In such a way, any repair can be done offline from a blade manufacturing line. When such a precasted beam is introduced in a blade mold, the metal conductors may be connected to the down conductor.

For transportation and protection, it is an option to add an isolating layer wrapped around the electrically conductive material.

In an embodiment of the invention, the at least one electrically isolating material cover is wrapped around the beam and/or the at least one electrically conductive material cover is wrapped around the electrically isolating material cover. This is a particularly cost-effective manufacturing method for providing the lightning protection according to embodiments of the invention.

BRIEF DESCRIPTION

Figure 2:
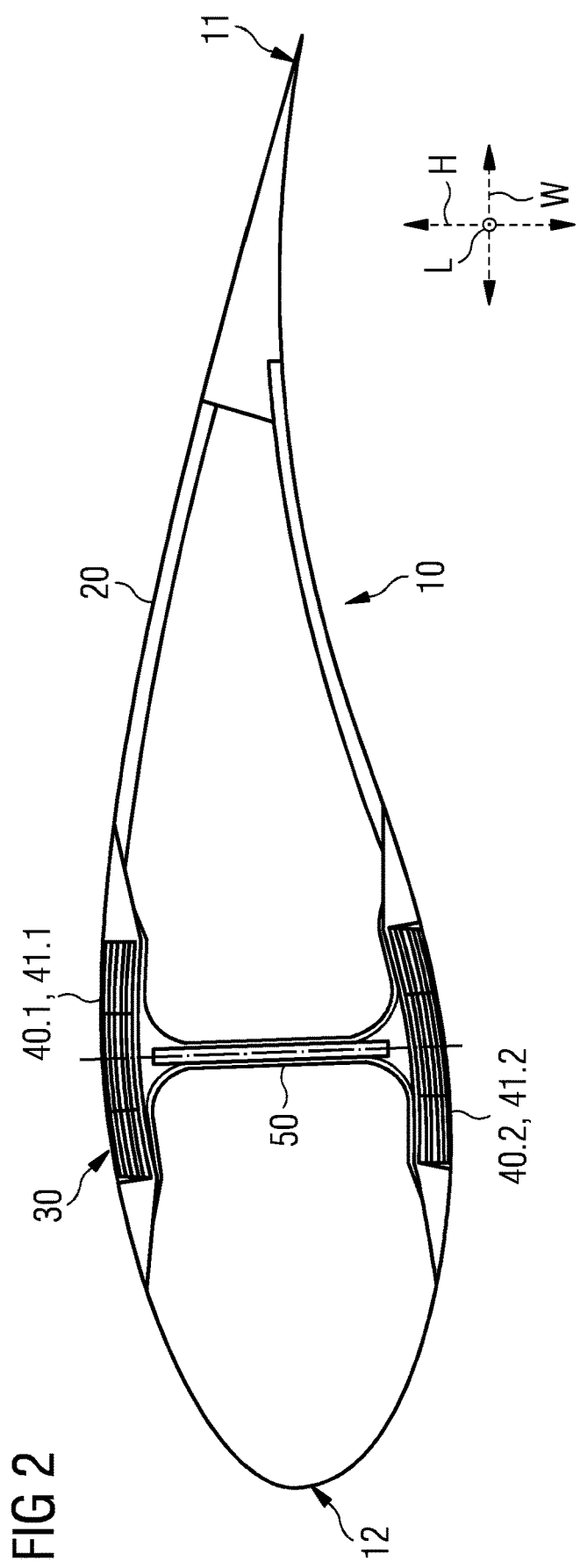
Figure 3:
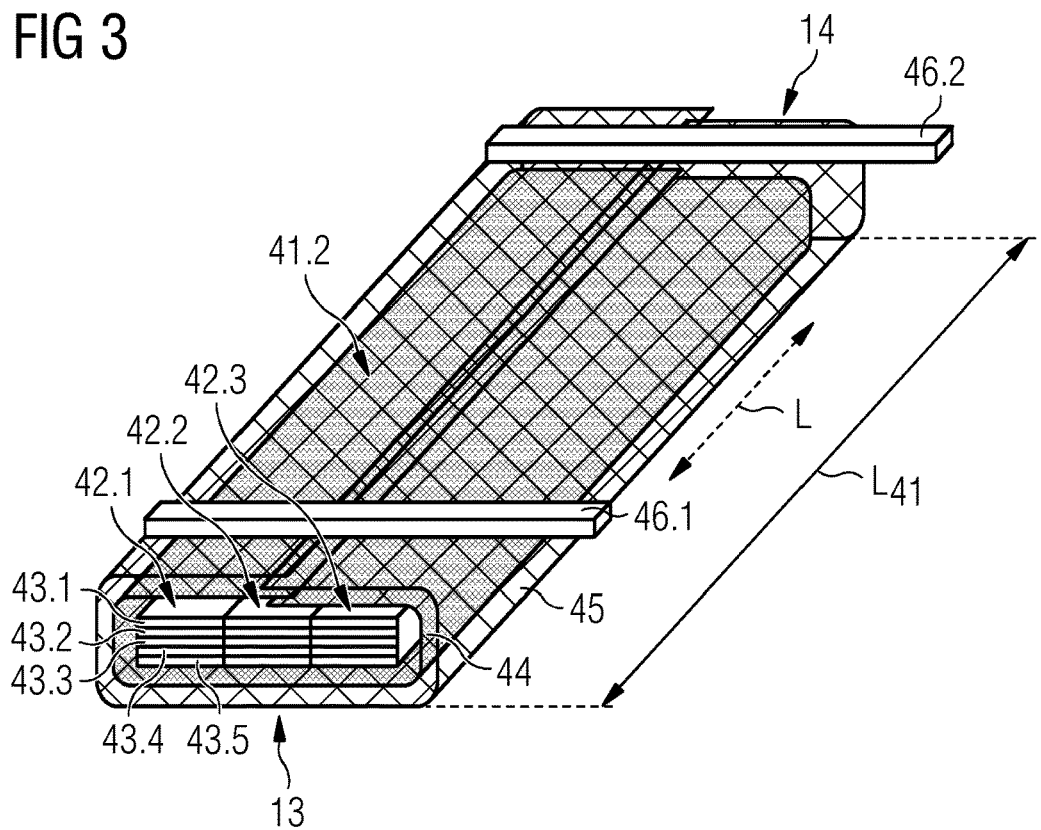
Figure 4:
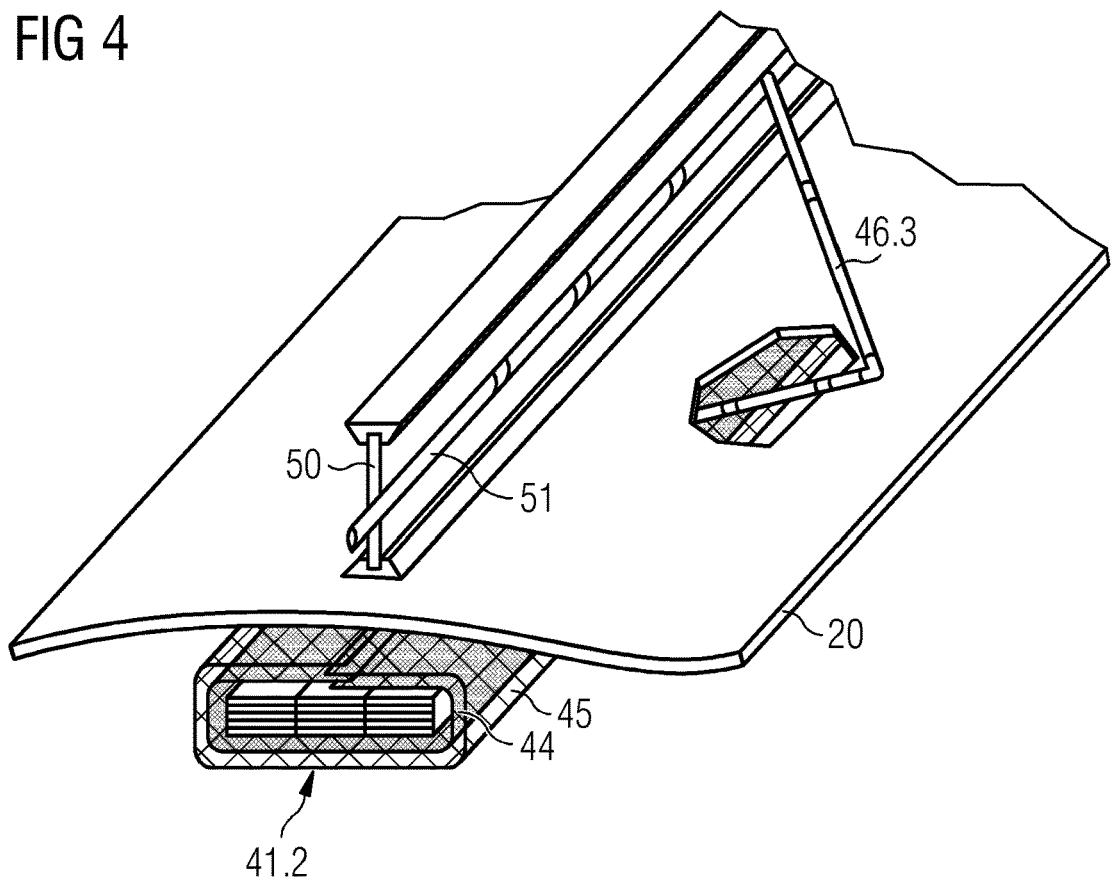

Some of the embodiments will be described in detail, with reference to the following figures, wherein like designations denote like members, wherein:

FIG. 1 a side view on an embodiment of a wind turbine according to embodiments of the invention;

FIG. 2 a side sectional view along a transversal plane of a wind turbine blade of the wind turbine of FIG. 1;

FIG. 3 a side perspective view on a beam of the wind turbine blade of FIG. 2; and FIG. 4 a side perspective view on an arrangement of a middle portion of the beam of FIG. 3 in the wind turbine blade of FIG. 2.

DETAILED DESCRIPTION

FIG. 1 is a side view on an embodiment of a wind turbine 1 according to embodiments of the invention. The wind turbine 1 is provided with three wind turbine blades 10.1, 10.2, 10.3 attached to a hub 4 of the wind turbine 1, which is connected to a nacelle 3 of the wind turbine 1, the nacelle 3 being supported on a mast 2 of the wind turbine 1. Each of the wind turbine blades 10.1, 10.2, 10.3 has a root and a tip, wherein root 13.1 and tip 14.1 of the wind turbine blade 10 are denominated in FIG. 1.

FIG. 2 is a side sectional view along the transversal plane of line X-X depicted in FIG. 1 of the wind turbine blade 10.1 of the wind turbine 1 of FIG. 1. The wind turbine blade 10 has a longitudinal extension in a longitudinal direction L, a width extension in a width direction W and a height extension in a height direction H. The wind turbine blade 10 further has a trailing edge 11 and a leading edge 12. The wind turbine blade 10 comprises a shell 20 and a spar 30 attached to the shell 20. The spar 30 comprises two spar caps 40.1, 40.2, each of which has a beam 41.1, 41.2. The two spar caps 40.1, 40.2 face each other and are connected to one another by means of a spar web 50, in this particular embodiment. However, other arrangements of the spar 30, such as an H-beam or X-beam type spar 30 are possible.

FIG. 3 is a side perspective view on the beam 41.2 of the wind turbine blade 10 of FIG. 2. The beam 41.2 is elongated in the longitudinal direction L. The beam 41.2 is tapered towards its longitudinal ends, in particular root and tip of the beam 41.2, which however, is not shown in FIG. 3. The beam 41.2 is made from carbon fiber-reinforced plastic. In particular, the beam comprises multiple pultruded strips 43 made from carbon fiber-reinforced plastic, of which the strips 43.1, 43.2, 43.3, 43.4, 43.5 are depicted. The multiple stacks 42 are arranged as three adjacent stacks 42.1, 42.2, 42.3, each of which comprises five strips 43 stacked on top of one another. An electrically isolating material cover 44 is wrapped around an entire circumference of the beam 41.2, the circumference running transverse to a longitudinal direction L of the beam 41.2. An electrically conductive material cover 45 is wrapped around the entire circumference of the electrically isolating material cover 44 wrapped around the at least one beam 41.2. Ends of the electrically isolating material cover 44 are overlapping one another and in particular connected to one another. Ends of the electrically conductive material cover 45 are also overlapping one another and in particular connected to one another. The electrically isolating material cover 44 and the electrically conductive material cover 45 are arranged along an entire length L41 of the beam 41.2, the length L41 of the beam 41.2 being measured in the longitudinal direction L. Preferably the electrically isolating material cover 44 and/or the electrically conductive material cover 45 extend beyond opposite longitudinal ends of the beam 41.2.

A first metal conductor 46.1 is provided at the root 13 of the beam 41.2, i.e. the wind turbine blade 10, and a second metal conductor 46.2 is provided at the tip 14 of the beam 41.2, i.e. the wind turbine blade 10. The first and second metal conductors 46.1, 46.2 are arranged transverse to the longitudinal direction L.

FIG. 4 is a side perspective view on an arrangement of a middle portion of the beam 41.2 of FIG. 3 in the wind turbine blade 10 of FIG. 2. Therein, an inner part of the shell 20 is connected to the beam 41.2 and the spar web 50. The electrically conductive material cover 45 is connected to a down conductor 51 by means of a third metal conductor 46.3, with the first metal conductor 46.1 and second metal conductor 46.2 not being shown as FIG. 4 only shows a middle portion of the beam 41.2. The third metal conductor 46.3 is an equipotential connection to equipotentialize the voltage built up between the down conductor 51 and the electrically conductive material cover 45. The metal conductor 46.3 is designed as a flexible metal cable in this particular embodiment. The metal conductor 46.3 is further made from copper in this particular embodiment.

A down conductor 51 of the wind turbine blade 10 is attached along 80% to 100% of the entire length of the spar web 50. The down conductor 51 is electrically connected to the electrically conductive material cover 45 by means of the third metal conductor 46.3. The third metal conductor 46.3 is led through an opening in the shell 20, in particular the inner part of the shell 20.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A spar cap for a wind turbine blade of a wind turbine, the spar cap comprising at least one elongated beam, wherein, the spar cap includes at least one electrically isolating material cover and at least one electrically conductive material cover, wherein an entire circumference of the beam is enclosed by at least one electrically isolating material cover and the entire circumference of the at least one electrically isolating material cover is enclosed by at least one electrically conductive material cover, whereby the electrically conductive material cover has at least one electrical interface for electrically connecting it to a down conductor of the wind turbine blade.

2. The spar cap according to claim 1, wherein the electrically isolating material cover and/or the electrically conductive material cover are arranged along at least 80% of a length of the beam, at least along the entire length of the beam and beyond the entire length of the beam, so that the electrically conductive material cover extends beyond at least one longitudinal end of the beam.

3. The spar cap according to claim 1, wherein, the electrically isolating material cover comprises glass fibers.

4. The spar cap according to claim 1, wherein, the electrically conductive material cover is a metal mesh.

5. The spar cap according to claim 1, wherein, the at least one beam comprises carbon fiber-reinforced plastic.

6. The spar cap according to claim 1, wherein, the at least one beam is precasted together with at least one of the isolating material cover and the electrically conductive material cover.

7. A wind turbine blade for a wind turbine, the wind turbine blade having a shell, a down conductor and a spar attached to the shell, wherein the spar comprises two spar caps and a spar web connecting the two spar caps with one another, whereby at least one of the spar caps is according to claim 1.

8. The wind turbine blade according to claim 7, wherein, the at least one electrical interface of the electrically conductive material cover of the at least one spar cap is connected to the down conductor by at least one metal conductor.

9. The wind turbine blade according to claim 8, wherein, at least one of the at least one metal conductor is a flexible metal cable.

10. The wind turbine blade according to claim 8, wherein, at least one of the at least one metal conductor is provided at or within a distance of 5% of the length of the beam from a root of the wind turbine blade and/or at least one of the at least one metal conductor is provided at or within a distance of 5% of the length of the beam from a tip of the wind turbine blade.

11. The wind turbine blade according to claim 7, wherein, the down conductor is attached to the spar web, along at least 80% of the length of the spar web.

12. The wind turbine comprising at least one wind turbine blade according to claim 7.

13. A method of manufacturing a spar cap for a wind turbine blade of a wind turbine, the spar cap comprising at least one elongated beam,
the method comprises the steps of:
(a) enclosing an entire circumference of the beam by at least one electrically isolating material cover,
(b) enclosing an entire circumference of the at least one electrically isolating material cover by at least one electrically conductive material cover, and
(c) providing the electrically conductive material cover with at least one electrical interface for electrically connecting it to a down conductor of the wind turbine blade.

* * * * *